(12) United States Patent
Masuda et al.

(10) Patent No.: US 9,172,078 B2
(45) Date of Patent: Oct. 27, 2015

(54) ENERGY STORAGE ELEMENT AND METHOD FOR MANUFACTURING THE SAME

(71) Applicant: GS Yuasa International Ltd., Kyoto-shi (JP)

(72) Inventors: Hideki Masuda, Kyoto (JP); Masamitsu Tononishi, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 211 days.

(21) Appl. No.: 13/688,072

(22) Filed: Nov. 28, 2012

(65) Prior Publication Data

US 2013/0136976 A1 May 30, 2013

(30) Foreign Application Priority Data

Nov. 29, 2011 (JP) ................................ 2011-261066
Nov. 9, 2012 (JP) ................................ 2012-247807

(51) Int. Cl.
*H01M 2/24* (2006.01)
*H01M 2/02* (2006.01)
*H01M 2/04* (2006.01)
*H01M 2/06* (2006.01)
*H01M 2/22* (2006.01)
*H01M 2/26* (2006.01)
*H01M 2/30* (2006.01)

(52) U.S. Cl.
CPC ................ *H01M 2/24* (2013.01); *H01M 2/021* (2013.01); *H01M 2/027* (2013.01); *H01M 2/0212* (2013.01); *H01M 2/0232* (2013.01); *H01M 2/04* (2013.01); *H01M 2/06* (2013.01); *H01M 2/22* (2013.01); *H01M 2/263* (2013.01); *H01M 2/30* (2013.01); *Y10T 29/4911* (2015.01)

(58) Field of Classification Search
CPC . H01M 2/0232; H01M 2/021; H01M 2/0212; H01M 2/027; H01M 2/06
USPC ................................ 429/168, 170, 176–181
See application file for complete search history.

(56) References Cited

U.S. PATENT DOCUMENTS

| | | | | |
|---|---|---|---|---|
| 2010/0233528 | A1* | 9/2010 | Kim et al. | 429/178 |
| 2012/0021277 | A1* | 1/2012 | Byun et al. | 429/178 |
| 2012/0088138 | A1* | 4/2012 | Munenaga et al. | 429/94 |
| 2012/0148910 | A1 | 6/2012 | Kambayashi et al. | |
| 2012/0264008 | A1* | 10/2012 | Okamoto et al. | 429/182 |

FOREIGN PATENT DOCUMENTS

| | | | |
|---|---|---|---|
| JP | 2010-97822 A | 4/2010 | |
| WO | WO 2010147136 | * 12/2010 | |

* cited by examiner

*Primary Examiner* — Stewart Fraser
*Assistant Examiner* — Rachel Zhang
(74) *Attorney, Agent, or Firm* — McGinn IP Law Group, PLLC.

(57) ABSTRACT

An energy storage element includes: a container; an electrode assembly housed in the container; an electrode terminal; a current collector which electrically connects the electrode terminal and the electrode assembly; and an external insulation sealing member for insulating the container and the electrode terminal. The container includes a protrusion part having a through-hole for allowing penetration of the electrode terminal and protruding from the upper surface of the container. The electrode terminal is electrically connected to the current collector in a state where the electrode terminal penetrates through the protrusion part. The external insulation sealing member has a side part disposed along the side surface of the protrusion part, and the end surface of the end part of the side part at the side of the upper surface is apart from the upper surface.

20 Claims, 9 Drawing Sheets

ENERGY STORAGE ELEMENT AND METHOD FOR MANUFACTURING THE SAME

CROSS REFERENCE TO RELATED APPLICATIONS

The present application is based on and claims priority of Japanese Patent Application No. 2011-261066 filed on Nov. 29, 2011 and Japanese Patent Application No. 2012-247807 filed on Nov. 9, 2012. The entire disclosure of the above-identified applications, including the specifications, drawings and claims is incorporated herein by reference in their entirety.

FIELD

The present invention relates to an energy storage element such as a battery including a secondary battery and a method for manufacturing such an energy storage element.

BACKGROUND

Secondary batteries are used as replacements for primary batteries, and have been wide spread as power sources for electric appliances such as mobile phones and information technology (IT) devices. In particular, non-aqueous electrolyte secondary batteries represented by lithium ion batteries have high energy density and are increasingly applied to large industrial electric apparatuses such as electric vehicles.

A conventional non-aqueous electrolyte secondary battery has connection parts each of which is for connecting (i) a corresponding one of current collectors disposed inside the container of the battery and is electrically connected to a corresponding one of a positive electrode and a negative electrode in the electrode assembly disposed inside the container and (ii) a corresponding one of the electrode terminals outside the container, so that electric energy generated by the electrode assembly can be extracted. Each of the connection parts is formed integrally with the corresponding electrode terminal to penetrate through the cap part of the container, so as to connect the corresponding current collector inside the container and the electrode terminal outside the container. For this reason, the cap part has through-holes for allowing penetration of the respectively corresponding connection parts.

The container is generally made of metal, and thus there is a need to insulate the container areas in which through-holes are formed and the electrode terminals, the connection parts, and the current collectors. This is because a short circuit is caused in the container if the connection parts penetrate through the cap part of the container via the through-holes without any insulation. In addition, the container contains electrolyte together with the electrode assembly, and there is a need to prevent the electrolyte from leaking to the outside of the container through the through-holes.

In order to insulate the container and the electrode terminals, the connection parts, and the current collectors and prevent the electrolyte from leaking to the outside of the container through the through-holes, a conventional energy storage element includes insulation sealing members provided to cover the cap part areas in which the through-holes of the container are formed at the outside and inside of the cap part of the container. For example, both the insulation and sealing between the container and the electrode terminals, connection parts, and the current collectors are achieved by means of the connection parts pressure-bonding the electrode terminals outside the container and the current collectors inside the container in a state where the container areas having the through-holes are covered at both the inside and outside of the cap part of the container by the insulation sealing members (see Patent Literature below).

CITATION LIST

Patent Literature

Japanese Unexamined Patent Application Publication No. 2010-097822

SUMMARY

Technical Problem

The present invention has been made in view of the aforementioned problems with an aim to provide an energy storage element which reliably achieves a sufficient degree of air-tightness around the electrode terminals.

Solution to Problem

In order to achieve the aforementioned aim, an energy storage element according to an aspect of the present invention is an energy storage element including: a container; an electrode assembly housed in the container; an electrode terminal; a current collector which electrically connects the electrode terminals and the electrode assembly; and an insulation member which insulates the container and the electrode terminal, wherein the container has a protrusion part which protrudes outward from an upper surface of the container, the protrusion part has a through-hole for allowing penetration of the electrode terminal, the electrode terminal is electrically connected to the current collector in a state where the electrode terminal penetrates through the protrusion part via the through-hole, the insulation member has a side part positioned along a side surface of the protrusion part, and the side part of the insulation member has an end part which is at a side of the upper surface of the container and is apart from the upper surface.

With this, the container is provided with (i) the protrusion part which protrudes outward from the upper surface of the container and (ii) the insulating member having a side part at the side of the side surface of the protrusion part, so as to prevent the insulating member from rotating about the connection part penetrating through the upper surface of the container. The side part extends along the side surface of the protrusion part, and the end part which is positioned at the side of the upper surface of the container and along the side part of the protrusion part is apart from the upper surface of the container.

Accordingly, for example, when the insulating member and the container are pressure-bonded by the connection part, it is possible to prevent the end part of the side part from pressing the upper surface of the container. For this reason, it is possible to prevent that the protrusion part area having the through-hole in the upper surface of the container is not completely sealed by the insulating member with an unsealed area left and that the side part itself is corrupted. In this way, it is possible to achieve a sufficient degree of air-tightness of the container.

In addition, the electrode terminal may be configured to pressure-bond at least the insulation member and the protrusion part of the container, so that the electrode terminal is sealed from a protrusion part area having the through-hole of the container by the insulation member, and the side part of the insulation member may have the end part apart from the upper surface of the container in a state where the insulation member is pressure-bonded to the protrusion part of the container by the electrode terminal.

According to this, the container is provided with the protrusion part having the through-hole for allowing penetration of the connection part. In order to seal, by the insulating member, the gap between the protrusion part area having the through-hole in the upper surface of the container and the connection part penetrating through the through-hole of the protrusion part of the container, the insulating member and the protrusion part of the container are pressure-bonded by the connection part.

Accordingly, for example, when the insulating member and the container are pressure-bonded by the connection part, it is possible to prevent the end part of the side part from pressing the upper surface of the container. For this reason, it is possible to prevent that the protrusion part area having the through-hole in the upper surface of the container is not completely sealed by the insulating member with an unsealed area left and that the side part itself is corrupted. In this way, it is possible to achieve a sufficient degree of air-tightness of the container.

In addition, the electrode terminal may include: a plate-shaped terminal body disposed above the protrusion part in a protrusion direction; and a column-shaped connection part which extends in a direction crossing a principal surface of the terminal body and penetrates through the protrusion part via the through-hole.

In addition, the insulation member may further include: a cylinder part which is sandwitched between the through-hole of the protrusion part and the connection part; and a plate part which is sandwitched between the protrusion part and the electrode terminal, and which extends, from an end part of the cylinder part, in an outward direction crossing an axis of the cylinder part, and the side part of the insulation member is formed continuously from an outer edge of the plate part, along the side surface of the protrusion part.

In addition, the electrode terminal: may have a riveted end having an outer diameter larger than a diameter of the through-hole of the protrusion part, the riveted end being formed by riveting an end portion of the connection part, and the end portion being at a side opposite to the terminal body; and may be configured to sandwitch and pressure-bond, by the riveted end and the terminal body, the protrusion part of the container and the insulation member.

According to this, the electrode terminal has the column-shaped connection part penetrating through the container for electrically connecting to the current collector. The insulating member includes (i) a plate part which is sandwitched between the protrusion part of the container and the terminal body and (ii) a cylinder part for insulating the protrusion part area having the through-hole of the container and the connection part. The electrode terminal pressure-bonds the protrusion part of the container and the insulating member when the end part at the side opposite to the side of the terminal body of the connection part is riveted in a state where the connection part penetrates through the cylinder part of the insulating member and the through-hole of the protrusion part in the container.

Accordingly, the insulating member in the state of being pressure-bonded makes it possible to bring the through-hole in the part to be stacked in the container into close contact with each other by means of the protrusion part and the plate part, and thus to reliably seal the protrusion part area of the container. In addition, the insulating member can reliably insulate the protrusion part and the terminal body of the electrode terminal. Furthermore, the insulating member can reliably insulate the protrusion part area having the through-hole in the upper surface of the container and the connection part of the electrode terminal, allowing penetration of the connection part of the electrode terminal via its cylinder part without causing a short circuit. In addition, the protrusion part may further include a top part which includes the through-hole and which is for sandwitching the plate part together with the terminal body, wherein the side surface of the protrusion part may be the side wall part which is formed continuously from an outer edge of the top part, in contact with the upper surface of the container, and the plate part of the top part may have a non-circular outer edge.

In addition, the side part of the insulation member may have: a first side wall part positioned along a first part of the side surface of the protrusion part; and a second side wall part positioned along a second part of the side surface of the protrusion part, the second part being opposite to the first part, and the first side wall part and the second side wall part may be tilted so as to be farther apart from each other at positions closer to the upper surface of the container.

By configuring the energy storage element such that the first side wall part and the second side wall part arranged to sandwitch the protrusion part are tilted so as to be farther apart from each other at the positions closer to the upper surface of the container, it is possible to easily assemble the insulating member at the outside of the upper surface of the container and provide the insulating member with a rotation preventing part or a rotation prevention function at the side thereof.

In addition, the protrusion part may have a first side surface facing the first side wall part and a second side surface facing the second side wall part, and the first side surface and the second side face may be tilted so as to be farther apart from each other at the positions closer to the upper surface of the container, and the first side wall part and the second side wall part may form a first angle which is larger than or equal to a second angle formed by the first side surface and the second side surface.

For example, the first angle formed by the first side wall part and the second side wall part is larger than or equal to the second angle formed by the first side surface and the second side surface. When the first angle and the second angle are equal in this case, the first side wall part and the first side surface are closely in contact with each other, and the second side wall part and the second side surface are also closely in contact with each other. In this way, it is possible to reliably achieve a higher degree of adhesion at the time of pressure-bonding while maintaining the easiness in boding the protrusion parts and the insulating members.

Here, the container may include a cap part, and the protrusion part may be formed in the cap part of the container.

In addition, the present invention may be implemented as a method for manufacturing an energy storage element including: a container; an electrode assembly housed in the container; an electrode terminal; a current collector which electrically connects the electrode terminal and the electrode assembly; and an insulation member which insulates the container and the electrode terminal, and the method may include: disposing the insulation member to be sandwitched between the container and the electrode terminal; and pressure-bonding, by the electrode terminal, the insulation member and the protrusion part of the container, within a range in which an upper surface of the container is not pressed by an end part of the side part.

Here, the container may include a cap part, the protrusion part may be formed in the cap part of the container, and the pressure-bonding may be pressure-bonding, by the electrode terminal, the insulation member, and the protrusion part in the cap part of the container, within a range in which an upper surface of the cap part of the container is not pressed by the end part of the side part.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENT

When manufacturing a conventional energy storage element, the following problem arises that it is difficult to provide components such as electrode terminals while maintaining designed postures thereof especially when the electrode terminals does not have the shape of a circle having a center axis that matches the center axis of the through-holes because insulation sealing members rotate about the center axis of the through-holes when the electrode terminals and current collectors are pressure-bonded by connection parts.

Figure 8:
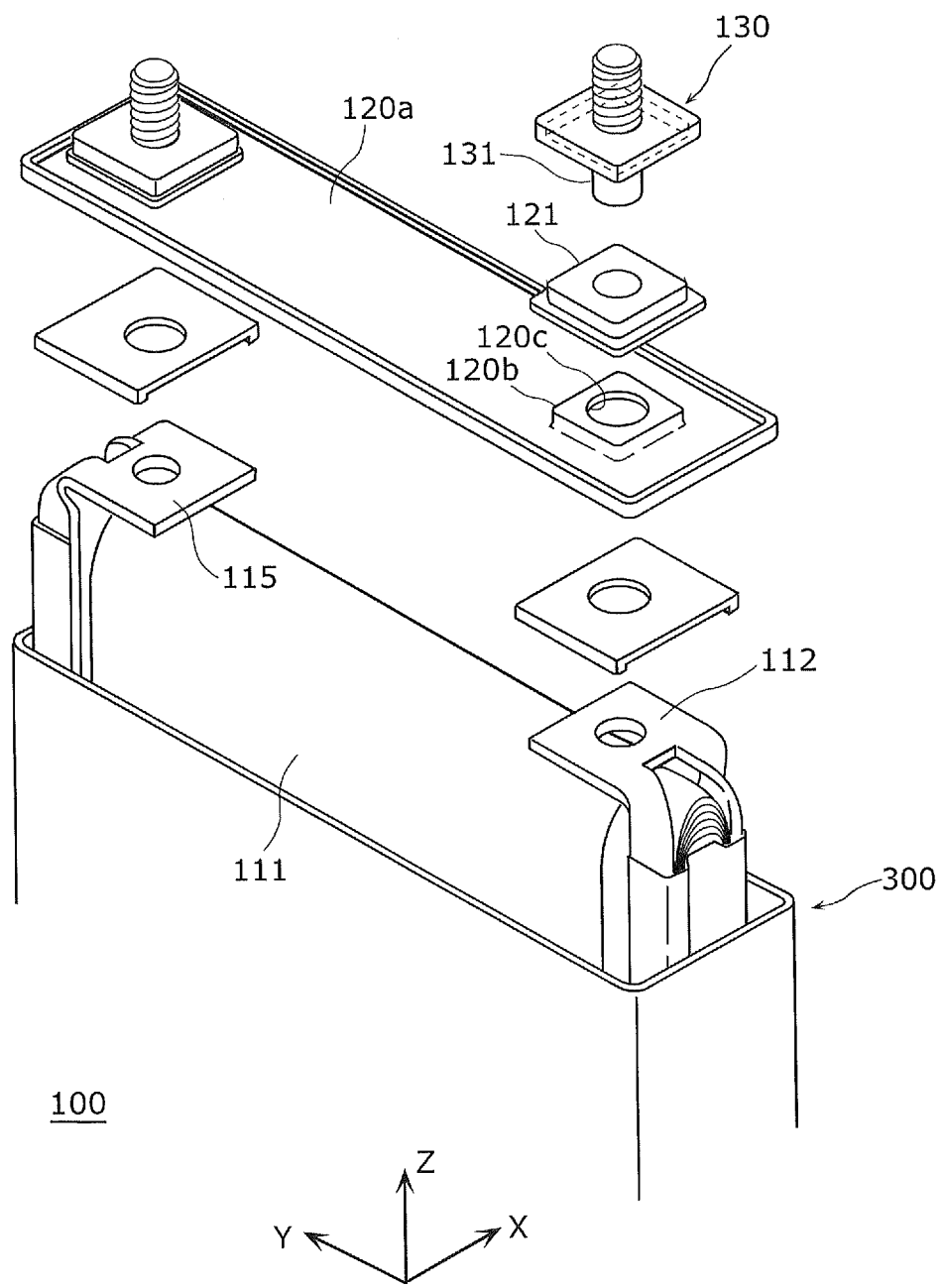
FIG. 8 is a schematic exploded perspective view of a non-aqueous electrolyte secondary battery according to a conventional technique.
Figure 9:
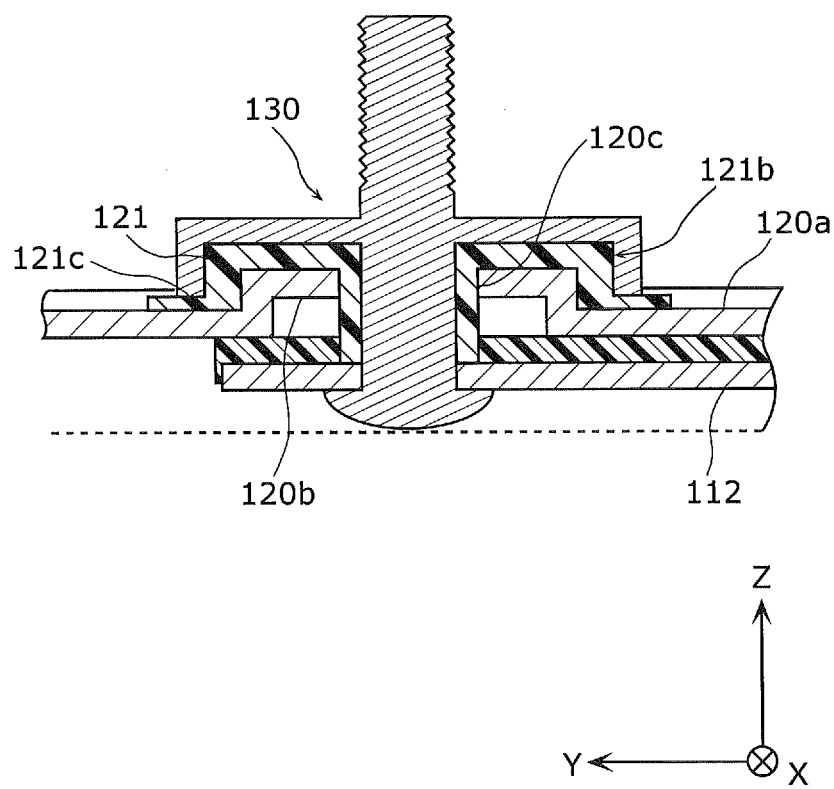
FIG. 9 is a cross-sectional view along the Y-Z plane of main parts around the electrode terminals of the non-aqueous electrolyte secondary battery according to the conventional technique.

In order to solve this problem, as shown in FIG. 8 and FIG. 9, the above-identified Patent Literature further provides: (i) around a through-hole 120c, a protrusion part 120b which protrudes outward from a container 300 and has a non-circular shape in a top view; and (ii) an insulation sealing member 121 with a rotation preventing part 121b which is a side surface of the protrusion part 120b. In other words, the rotation preventing part 121b provided to the insulation sealing member 121 is engaged with the side surface of the protrusion part 120b formed in the container 300, which prevents the insulation sealing member 121 from rotating about the through-hole 120c. FIG. 8 is a schematic exploded perspective view of a conventional non-aqueous electrolyte secondary battery. FIG. 9 is a cross-sectional view of main parts around the electrode terminals of the conventional non-aqueous electrolyte secondary battery.

However, according to the technique of the Patent Literature, as shown in FIG. 9, the protrusion part 120b is provided to the container 300, and the insulation sealing member 121 is provided with a rotation preventing part 121b which is the side surface of the protrusion part 120b and which extends to an upper surface 120a having the protrusion part 120b in the container 300. The rotation preventing part 121b is formed along the side surface of the protrusion part 120b, and thus is in the direction of pressure-bonding by the connection part 131. Thus, when the electrode terminal 130 outside the container 300 and the current collectors 112 and 115 inside the container 300 are pressure-bonded by the connection part 131, the distances between the electrode terminal 130 and the current collectors 112 and 115 are short, and the insulation sealing member 121 disposed therebetween is also shrunk. At this time, the rotation preventing part 121b of the insulation sealing member 121 extends toward the upper surface 120a of the cap part of the container 300 in the pressure-bonding direction. Thus, the end part 121c of the rotation preventing part 121b at the side of the upper surface 120a of the cap part of the container 300 presses the upper surface 120a. In other words, when pressure-bonded by the connection part 131, the rotation preventing part 121b of the insulation sealing member 121 functions as a tension pole against the upper surface 120a of the cap part of the container 300, and the insulation sealing member 121 is raised relatively higher at the area around the rotation preventing part 121b than at the area around the through-hole 120c. For this reason, the protrusion part area having the through-hole 120c in the cap part of the container 300 is not completely sealed by the insulation sealing member 121 with an unsealed area left and the rotation preventing part 121b itself may be corrupted. These factors may damage the air-tightness of the container 300.

Hereinafter, an embodiment of the present invention is described with reference to the drawings. The exemplary embodiment described below shows a specific preferable example. The numerical values, shapes, materials, structural elements, the arrangement and connection of the structural elements etc. shown in the following exemplary embodiment are mere examples, and therefore do not limit the scope of the present invention. Therefore, among the structural elements in the following exemplary embodiment, structural elements not recited in any one of the independent claims defining the most generic concept of the present invention are described as arbitrary structural elements in preferable implementations.

Embodiment

Figure 1:
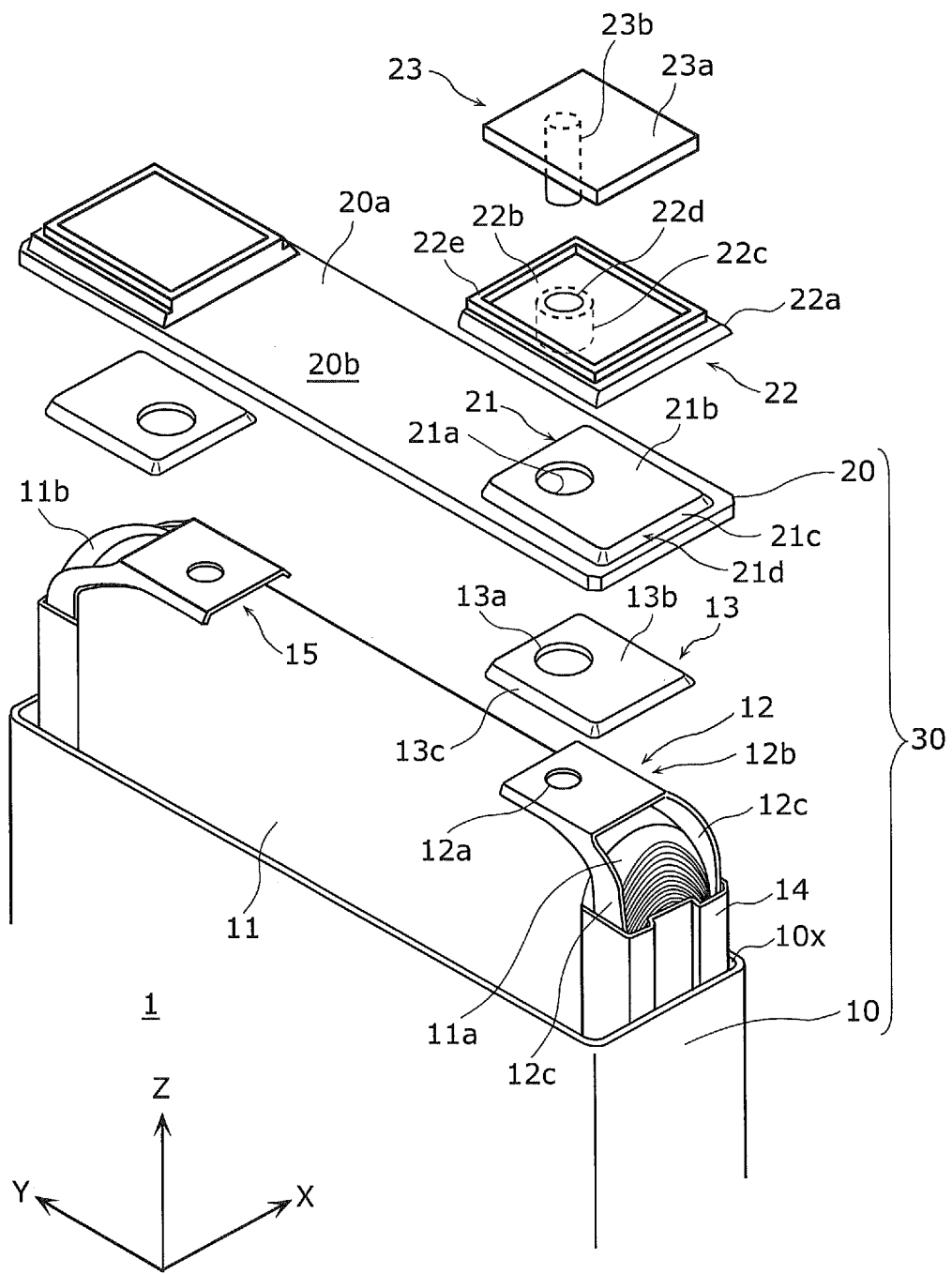
FIG. 1 is a schematic exploded perspective view of a non-aqueous electrolyte secondary battery having an exemplary structure according to an embodiment of the present invention.

FIG. 1 is a schematic exploded perspective view of a non-aqueous electrolyte secondary battery having an exemplary structure according to an embodiment of the present invention.

As shown in FIG. 1, the non-aqueous electrolyte secondary battery 1 includes: a container 30; an electrode assembly 11 housed inside the container 30; an electrode terminal 23; current collectors 12 and 15 for electrically connecting the electrode terminal 23 and the electrode assembly 11; an external insulation sealing member 22 which insulates the container 30 and the electrode terminal 23; and an internal insulation sealing member 13 for insulating the container 30 and the current collectors 12 and 15.

The container 30 includes a cap part 20 and a container body 10. The cap part 20 is a member having a long plate shape extending in the Y-axis direction (described later). The container body 10 is a rectangular cylindrical member having an opening 10x at a first end and a bottom at a second end. In this embodiment, the direction in which the container body 10 and the cap part 20 are arranged is referred to as an upper-lower direction (the Z-axis direction in FIG. 1), the direction in which a positive terminal and a negative terminal are arranged is referred to as a left-right direction (the Y-axis direction in FIG. 1), and the direction perpendicular to the upper-lower direction and the left-right direction is referred to as a front-back direction (the X-axis direction in FIG. 1).

The cap part 20 includes, at each of the end parts in the lengthwise direction, a protrusion part 21 which protrudes outward from an upper surface 20b of the cap part 20 of the container 30 and a plate-shaped cap body 20a which is the part other than the protrusion part 21. Here, the upper surface 20b of the cap part 20 is an outer surface of the cap body 20a of the container 30. In other words, the container 30 includes the protrusion part 21 which protrudes outward from the upper surface 20b of the cap part of the container 30.

The protrusion part 21 includes a plate part 21b which is a top part and a side wall part 21d. The plate part 21b is a flat-plate shaped member which makes up the upper part of the protrusion part 21, has a shape of a rectangle having parallel sides in the X-axis direction and the Y-axis direction in a plan view, and is parallel to the cap body 20a. In addition, the protrusion part 21 includes the plate part 21b with a through-hole 21a for allowing penetration of the electrode terminal 23. Here, FIG. 1 shows only a through-hole 21a at the positive electrode side, and does not show a through-hole at the negative electrode side because the latter through-hole is hidden behind an insulation sealing member later described.

An electrode assembly 11 is formed by stacking band-shaped positive and negative electrodes with a separator inbetween and winding the whole stack in the shape of a long cylinder. The electrode assembly 11 is housed in the container 30 in the direction in which the winding axis direction matches the Y-axis direction and the long axis of the cross section of the long circle matches the Z-axis direction. The positive electrode and the negative electrode are shifted from each other in the winding axis direction and are wound about the winding axis direction in the shape of a long circle. The electrode assembly 11 includes projection parts 11a and 11b corresponding to the positive electrode and the negative electrode and each of which projects outward from a corresponding separator in the winding axis direction (the Y-axis direction) of the electrode assembly 11. In other words, the electrode assembly 11 includes the projection part 11a disposed at the positive electrode side and projecting from the separator at a first end in the winding axis direction, and the projection part 11b disposed at the negative electrode side and projecting from the separator at a second end in the winding axis direction. Furthermore, the projection part 11a at the positive electrode side and the projection part 11b at the negative electrode side do not include any active material, and thus metal foil which is a base material thereof is exposed. More specifically, the projection part 11a at the positive electrode side includes exposed aluminum foil which is the base material of the positive electrode without any positive electrode active layer, and the projection part 11b at the negative electrode side includes exposed cupper foil which is the base material of the negative electrode without any negative electrode active layer. To the projection part 11a at the positive electrode side and the projection part 11b at the negative electrode side, a current collector 12 at the positive electrode side and a current collector 15 at the negative electrode side are electrically connected, respectively.

The current collector 12 has an upper end part with a plate-shaped part (a plate part 12b1 later described) which is parallel to the upper surface of the electrode assembly 11 (which is parallel to the X-Y plane). The plate-shaped part has a through-hole 12a. The current collector 12 disposed at the positive electrode side which is a first end of the winding axis direction in which the electrode assembly 11 is wound has curved sides (arm parts 12c described later) which are along an outer side surface in the X-axis direction of the projection part 11a and which extend in the Z-axis direction. These curved sides are sandwitched by holding plates 14 made of aluminum or an aluminum alloy together with the projection part 11a at the positive electrode side, and are connected and fixed by ultrasonic welding or the like. The current collector 15 at the negative electrode side also has the same or a similar structure, and is formed with cupper or a cupper alloy. The current collector 12 at the positive electrode side and the current collector 15 at the negative electrode side are the same or similar in structure. Thus, only the current collector 12 at the positive electrode side is described, and the current collector 15 at the negative electrode side is not described.

The structure of the current collector 12 (and the current collector 15) is described in detail later.

The internal insulation sealing member 13 is an insulating member which insulates the container 30 and the current collector 12 by being sandwitched between the cap part 20 and the current collector 12. In other words, the internal insulation sealing member 13 is an insulation member which is disposed inside the container 30 and is for insulating the container 30 from the electrode assembly 11 electrically connected via the current collector 12. In addition, the internal insulation sealing member 13 functions as a sealing member (packing) for sealing the through-hole 21a by being pressure-bonded to the through-hole 21a formed in the cap part 20 of the container 30 together with the electrode terminal 23 and the external insulation sealing member 22. The internal insulation sealing member 13 has a shape for covering the base part 12b (see a later-provided description) of the current collector 12 from the side of the electrode terminal 23. The internal insulation sealing member 13 is made of a synthetic resin or the like, and has insulation and elastic properties. In addition to the through-hole 21a of the cap part 20 and the through-hole 12a of the current collector 12, the internal insulation sealing member 13 includes a through-hole 13a for allowing penetration of a connection part 23b (later described) of the electrode terminal 23.

The external insulation sealing member 22 is an insulation member which insulates the electrode terminal 23 and the container 30 by being sandwitched between the terminal body 23a (later described) of the electrode terminal 23 and the protrusion part 21 of the cap part 20. In other words, the external insulation sealing member 22 is an insulation member which is disposed outside the container 30 and is for insulating the container 30 from the electrode assembly 11 electrically connected via the electrode terminal 23 and the current collector 12. In addition, the external insulation sealing member 22 functions as a sealing member (packing) for sealing the through-hole 21a by being pressure-bonded to the through-hole 21a formed in the cap part 20 of the container 30 together with the electrode terminal 23 and the internal insulation sealing member 13. The external insulation sealing member 22 is disposed on the plate part 21b of the protrusion part 21, and includes a cylinder-shaped cylinder part 22c which is formed to be continuous with a through-hole 22d in the plate part 22b and to extend below the plate part 22b. In other words, the external insulation sealing member 22 includes the cylinder part 22c and the plate part 22b extending in the direction which is a direction crossing the axis of the cylinder part 22c and outward of the cylinder part 22c.

In addition, the external insulation sealing member 22 includes a side wall part 22a formed at the outer edge of the plate part 22b along side surfaces of the protrusion part 21. In other words, the external insulation sealing member 22 is a member including the plate part 22b and the side wall part 22a for covering the outside of the protrusion part 21.

The external insulation sealing member 22 is a member made of a synthetic resin, as in the case of the internal insulation sealing member 13. The through-hole 22d formed in the external insulation sealing member 22 allows penetration of the later-described electrode terminal 23 by means of the connection part 23b, in addition to the through-hole 21a formed in the cap part 20, the through-hole 13a formed in the internal insulation sealing member 13, and the through-hole 12a formed in the current collector 12.

In addition, the cylinder part 22c of the external insulation sealing member 22 is formed at the side (the lower side of the plate part 22b) facing the cap part 20, and has an inner edge which matches the through-hole 22d. In addition, the cylinder part 22c has an outer edge which fits into the through-holes 13a and 21a. Accordingly, the cylinder part 22c is sandwitched between the through-hole 21a formed in the protrusion part 21 of the container 30 and the connection part 23b of the electrode terminal 23. In other words, the external insulation sealing member 22 insulates the electrode terminal 23 and the container 30 by being sandwitched between the terminal body 23a of the electrode terminal 23 and the plate part 21b of the protrusion part 21 of the container 30 and being sandwitched between the connection part 23b of the electrode terminal 23 and the protrusion part area having the through-hole 21a in the cap part 20 of the container 30.

Furthermore, a frame body 22e is formed on the marginal area of the plate part 22b which is of the external insulation sealing member 22 and in which the through-hole 22d is formed.

The electrode terminal 23 includes: a terminal body 23a disposed outward in the protrusion direction of the protrusion part 21 on the cap part 20 of the container 30; and a column-shaped connection part 23b which extends in the direction (below the terminal body 23a) crossing the principal surface of the terminal body 23a penetrates through the protrusion part 21 via the through-hole 21a formed in the cap part 20 of the container 30. The terminal body 23a has a flat outer edge corresponding to the shape of the inner edge of the frame body 22e. The connection part 23b takes roles for electrically connecting the terminal body 23a and the current collector 12 and mechanically bonding the cap part 20 and the electrode assembly 11. The electrode terminal 23 disposed at the positive electrode side is made of aluminum or an aluminum alloy, and the electrode terminal disposed at the negative electrode side is made of cupper or a cupper alloy.

The electrode terminal 23 is a member for completing electrical connection between the non-aqueous electrolyte secondary battery 1 and an external load by means of the terminal being fixed by welding onto the surface of the terminal body 23a (the terminal is of the not-shown external load that is, a device which consumes electric energy of the non-aqueous electrolyte secondary battery). Otherwise, the electrode terminal 23 is a member for completing electrical connection between a plurality of non-aqueous electrolyte secondary batteries 1 (not-shown) arranged next to each other by means of the terminal bodies 23a of the respective non-aqueous electrolyte secondary batteries 1 being fixed by welding using a bus bar.

Here, the electrode terminal 23 may be configured such that the terminal body 23a and the connection part 23b thereof are made of the same material by forging, casting, or the like.

In addition, the electrode terminal 23 may be configured such that the terminal body 23a and the connection part 23b thereof are independent of each other, and that the terminal body 23a and the connection part 23b are integrally formed using two different kinds of materials or the same material.

Figure 2:
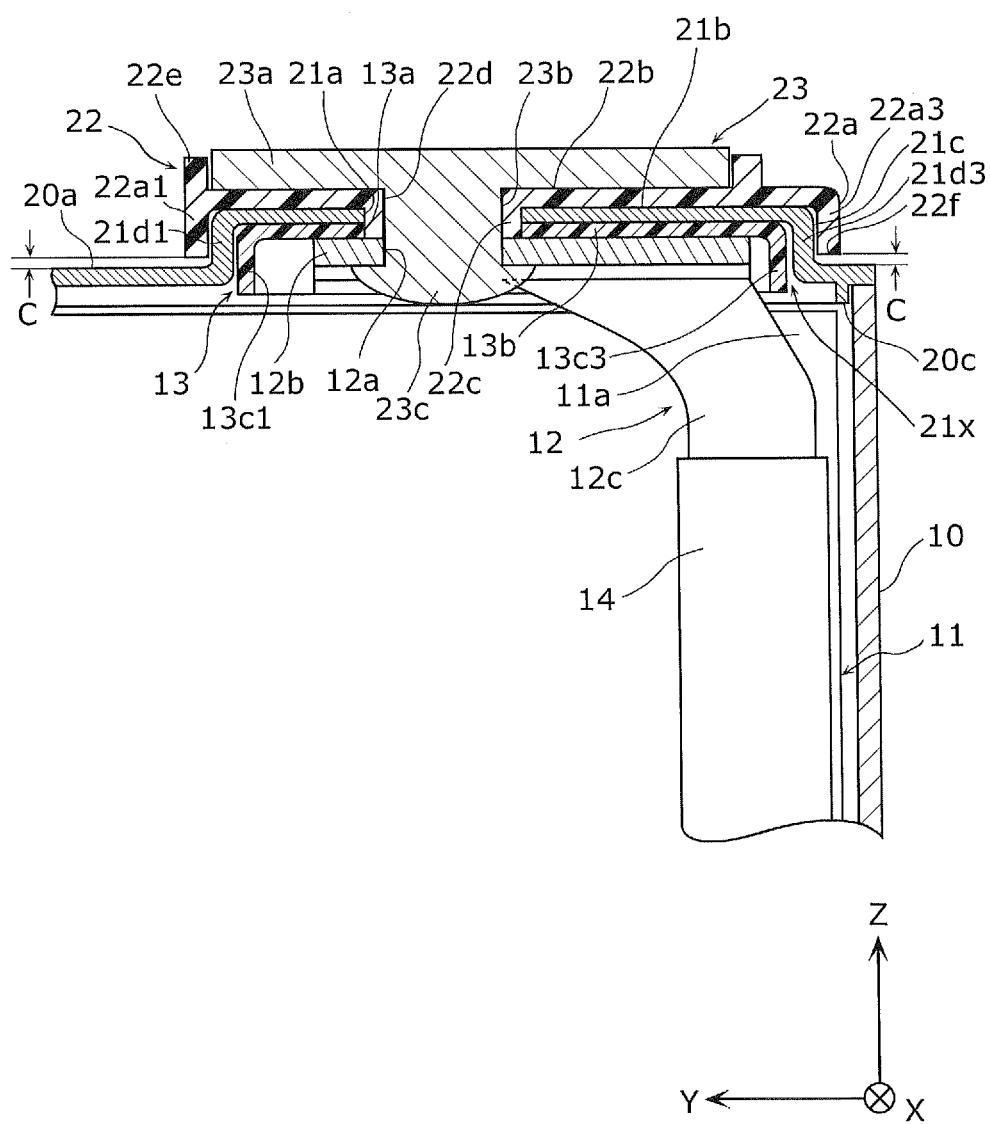
FIG. 2 is a cross-sectional view, in the Y-Z plane, of main parts around one of the electrode terminals of the non-aqueous electrolyte secondary battery.
Figure 3:
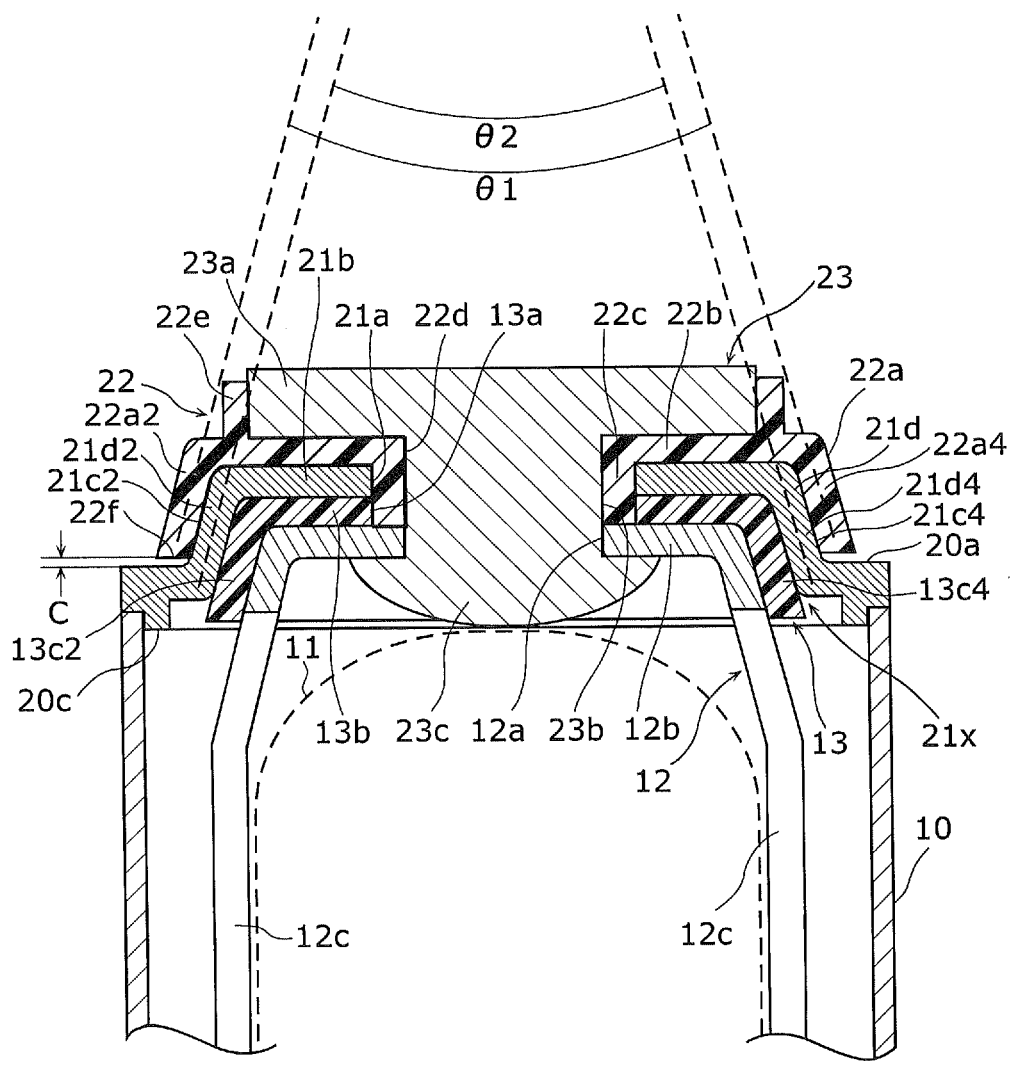
FIG. 3 is a cross-sectional view, in the X-Z plane, of main parts around the electrode terminals of the non-aqueous electrolyte secondary battery.

Next, with reference to FIG. 2 and FIG. 3, a detailed description is given of the structure of main parts around the electrode terminal 23 and the current collector 12 of the non-aqueous electrolyte secondary battery 1 according to this embodiment. FIG. 2 is a cross-sectional view, in the Y-Z plane, of main parts around one of the electrode terminals of the non-aqueous electrolyte secondary battery 1 already assembled as shown in FIG. 1. FIG. 3 is a cross-sectional view, in the X-Z plane, of the main parts around the electrode terminal of the non-aqueous electrolyte secondary battery 1 shown in FIG. 1.

As shown in FIG. 2 and FIG. 3, the structure of the components around the electrode terminal 23 and the current collector 12 of the non-aqueous electrolyte secondary battery 1 is a stack of the electrode terminal 23, the external insulation sealing member 22, the protrusion part 21 of the cap part 20, the internal insulation sealing member 13, and the plate part 12b1 of the current collector 12 stacked from above in the listed order. The external insulation sealing member 22 is disposed such that the plate part 22b is stacked on a plate part 21b of the protrusion part 21 on a plate part 13b (see a later-provided description) of the internal insulation sealing member 13, and that the cylinder part 22c penetrates through the through-hole 21a formed in the cap part 20 and the through-hole 13a formed in the internal insulation sealing member 13. The cylinder part 22c has an end surface which is on the same plane on which the lower surface of the internal insulation sealing member 13 is present and, together with the lower surface of the internal insulation sealing member 13, is on the upper surface of the plate part 12b1 which forms the principal surface of the current collector 12. The inner circumference of the cylinder part 22c of the external insulation sealing member 22 and the through-hole 12a of the current collector 12 are the same in size and shape. The cylinder part 22c and the through-hole 12a are penetrated by the connection part 23b of the electrode terminal 23. In other words, the outer circumference of the connection part 23b is in contact with the inner circumference of the cylinder part 22c and the through-hole 12a in the current collector 12. The connection part 23b of the electrode terminal 23 has a riveted end 23c formed in the state where the connection part 23b already penetrates through the cylinder part 22c of the external insulation sealing member 22 and the through-hole 12a formed in the current collector 12. More specifically, the electrode terminal 23 has a riveted end 23c which is formed by riveting an end part of the connection part 23b opposite to an end at the side of the terminal body 23a to have an outer diameter larger than the inner diameter of the cylinder part 22c and the diameter of the through-hole 12a formed in the current collector 12.

Since the outer diameter of the riveted end 23c is larger than the diameters of the respective through-holes 21a, 22d, 13a, and 12a, the external insulation sealing member 22, the cap part 20, the internal insulation sealing member 13, and the current collector 12 are pressure-bonded to each other and integrally fixed by being sandwitched by the terminal body 23a of the electrode terminal 23 and the riveted end 23c. In this way, the electrode terminal 23 pressure-bonds the protrusion part 21 of the container 30 and the external insulation sealing member 22, and thereby seals the protrusion part area having the through-hole 21a in the cap part 20 of the container 30 and the electrode terminal 23, using the external insulation sealing member 22 and the internal insulation sealing member 13. In addition, since the electrode terminal 23 is into contact with the current collector 12 at the connection part 23b and the riveted end 23c, the electrode terminal 23 is electrically connected to the current collector 12 in a state where the electrode terminal 23 already penetrates through the protrusion part 21 of the cap part 20 via the through-hole. Here, since the side surface of the connection part 23b is covered by the cylinder part 22c of the external insulation sealing member 22, the cap part 20 and the connection part 23b are securely in an insulated state.

Next, the structures of the respective parts are described.

As shown in FIG. 2 and FIG. 3, the cap part 20 in this embodiment is formed to have, on the back side (the lower side), a frame part 20c having an outer shape matching the inner edge shape of an opening 10x of the container body 10 so as to fit into the opening 10x. The frame part 20c is formed inside the side end which is of the cap part 20 and abuts the upper end surface of the container body 10. In other words, the cap part 20 is configured to have a larger thickness in the area with the frame part 20c than in the other area of the cap part 20. In addition, the cap part 20 has the largest thickness in the area with the frame part 20c, the second largest thickness in the area outside the frame part 20c, and the smallest thickness in the area inside the frame part 20c.

In addition, each of the structural members of the cap part 20 has a cross section having an approximately even thickness. The cap part 20 has a recess part 21x corresponding to the protrusion part 21, at the back side of the protrusion part 21. In other words, the protrusion part 21 of the cap part 20 is formed, for example, by pressing plate-shaped member having an even thickness to form a protrusion and a recess therein. Accordingly, the cap part 20 has a side wall part 21d which forms the side surface 21c of the protrusion part 21. As shown in FIG. 2 and FIG. 3, in a plan view, the side wall part 21d is formed (i) to be continuous from the outer edge of the rectangular-shaped plate part 21b to the cap body 20a along the lateral direction (X-axis direction) of the cap part 20 and the longitudinal direction (Y-axis direction), and along a direction crossing the cap part 20a. The side wall part 21d has four side parts 21d1, 21d2, 21d3, and 21d4 facing four directions. Adjacent ones of the four side parts 21d1, 21d2, 21d3, and 21d4 are continuous to each other. Among the four side parts 21d1, 21d2, 21d3, and 21d4, the paired side parts 21d1 and 21d3 continuous to the outer edge in the lateral direction (X-axis direction) of the plate part 21b of the protrusion part 21 are formed to be bent perpendicularly with respect to the cap body 20a and the plate part 21b (see FIG. 2). In addition, among the four side parts 21d1, 21d2, 21d3, and 21d4, the paired side parts 21d2 and 21d4 continuous to the outer edge in the longitudinal direction (Y-axis direction) of the plate part 21b of the protrusion part 21 are formed by being bent with tilts so as to be farther apart from each other at the positions closer to the cap body 20a (see FIG. 3). In other words, the first side wall 21c2 and the second side wall 21c4 at the outer side in the X-axis direction of the paired side parts 21d2 and 21d4 in the Y-axis direction of the side wall part 21d are tilted so as to be farther apart from each other at the positions closer to the upper surface 20b of the cap part 20.

The internal insulation sealing member 13 has a plate part 13b and a side wall part 13c, similarly to the protrusion part 21 formed in the cap part 20. The internal insulation sealing member 13 has an upper-part shape corresponding to the shape of the recess part 21x. The plate part 13b has the shape of a flat plate parallel to the plate part 21b of the protrusion part 21, and, in a plan view, has the shape of a rectangle with the sides each parallel to the X-axis direction or Y-axis direction. The plate part 13b includes the aforementioned through-hole 13a formed therein. The side wall part 13c is formed to perpendicularly extend from the outer edge of the plate part 13b toward the electrode assembly 11 (that is, downward). The side wall part 13c has four side parts of 13c1, 13c2, 13c3, and 13c4 facing four directions. Adjacent ones of the four side parts 13c1, 13c2, 13c3, and 13c4 are continuous to each other. The side wall part 13c is parallel to the inner surface of the aforementioned side wall part 21d. In other words, among the four side parts 13c1, 13c2, 13c3, and 13c4, the paired side parts 13c1 and 13c3 respectively extend from the paired side parts in the X-axis direction of the plate part 13b are formed to be perpendicular to the plate part 13b. Among the four side parts 13c1, 13c2, 13c3, and 13c4, the paired side parts 13c2 and 13c4 are formed to respectively extend, with a tilt, from the paired side parts in the Y-axis direction of the plate part 13b, so as to be farther apart from each other at the positions closer to the bottom part. As shown in FIG. 3, the inner surfaces of the paired side parts 21d2 and 21d4 at opposite sides and the outer surfaces of the paired side parts 13c2 and 13c4 are in contact with each other. The paired side parts 21d2 and 21d4 among the side parts of the side wall part 21d are continuous from the outer edge in the longitudinal direction of the plate part 21b of the protrusion part 21, and the paired side parts 13c2 and 13c4 extend from respectively corresponding two of the side parts in the Y-axis direction of the plate part 13b of the internal insulation sealing member 13.

Furthermore, the external insulation sealing member 22 positioned at the upper part of the protrusion part 21 of the cap part 20 has a shape corresponding to the shape of the protrusion part 21 as in the case of the internal insulation sealing member 13. In the external insulation sealing member 22, the lower surface of the plate part 22b is in contact with the upper surface of the plate part 21b of the protrusion part 21, and the side wall part 22a extending from the outer edge of the plate part 22b and below the plate part 22b has a shape matching the shape of the side wall part 21d which forms the side surface of the protrusion part 21. The side wall part 22a has four side parts 22a1, 22a2, 22a3, and 22a4 facing four directions. Adjacent ones of the four side parts 22a1, 22a2, 22a3, and 22a4 are continuous to each other. Among the four side parts 22a1, 22a2, 22a3, and 22a4, the paired side parts 22a1 and 22a3 which extend downward from the paired side parts in the X-axis direction of the plate part 22b are formed to be perpendicular to the plate part 22b. Among the four side parts 22a1, 22a2, 22a3, and 22a4, the paired side parts 22a2 and 22a4 which extend downward from the paired side parts in the Y-axis direction of the plate part 22b are tilted so as to be farther apart from each other at the positions closer to the upper surface 20b of the cap part 20 of the container 30. In other words, the side wall part 22a of the external insulation sealing member 22 includes: a part 22a2 of the side wall part 22a as the first side wall part disposed along the part (the first side wall 21c2) of a side surface of a first protrusion part 21; and a part 22a4 of the side wall part 22a as the second side wall part disposed along the part (the second side wall 21c4) of a side surface of a second protrusion part 21 which is disposed at the side opposite to the first side wall part.

Here, the first angle $\theta 1$ formed by the part 22a2 and the part 22a4 of the side wall part 22a is equal to the second angle $\theta 2$ formed by the first side surface 21c2 and the second side surface 21c4. In other words, the inner surface of the part 22a2 in the X-axis direction of the side wall part 22a and the first side wall 21c2 are closely in contact with each other, and the inner surface of the part 22a4 in the X-axis direction of the side wall part 22a and the second side wall 21c4 are closely in contact with each other.

In this way, the external insulation sealing member 22 is formed such that the side wall part 22a extending from the outer edge of the plate part 22b is in contact with the side surface of the protrusion part 21. For this reason, the side wall part 22a has a function of preventing the external insulation sealing member 22 from rotating with respect to the container 30. In other words, the external insulation sealing member 22 is prevented from rotating about the through-hole 21a in the cap part 20 of the container 30 when its end is riveted by the electrode terminal 23 because the side wall part 22a engages the side surface of the protrusion part 21.

In addition, the distance in the Z-axis direction between the lower surface of the plate part 22b and the bottom end of the side wall part 22a is less than the distance in the Z-axis direction from the upper surface 20b of the cap body 20a to the upper surface of the plate part 21b of the protrusion part 21. In other words, as shown in FIG. 2 and FIG. 3, in the state where the external insulation sealing member 22, the cap part 20, the internal insulation sealing member 13, and the current collector 12 are sandwitched by the terminal body 23a of the electrode terminal 23 and the riveted end 23c and thereby being pressure-bonded to each other, the end surface 22f of the end part of the side wall part 22a (that is, the lower end of the side wall part 22a) at the side of the upper surface 20b of the cap part 20 of the container 30 is apart from the upper surface 20b of the cap part 20 by predetermined spacing C. In other words, the end part of the external insulation sealing member 22 is apart from the upper surface 20b of the cap part 20 of the container 30 in the state where the external insulation sealing member 22 is pressure-bonded by the electrode terminal 23 together with the protrusion part 21 in the cap part 20 of the container 30. Naturally, the end part of the external insulation sealing member 22 is apart from the upper surface 20b of the cap part 20 in the container 30 even in a state where the external insulation sealing member 22 is not pressure-bonded by the electrode terminal 23.

In this way, in the non-aqueous electrolyte secondary battery 1 in this embodiment, the cap part 20 has a protrusion part 21 and a corresponding recess part 21x, and the external insulation sealing member 22 and the internal insulation sealing member 13 have shapes matching the shapes of the protrusion part 21 and the recess part 21x.

Figure 4:
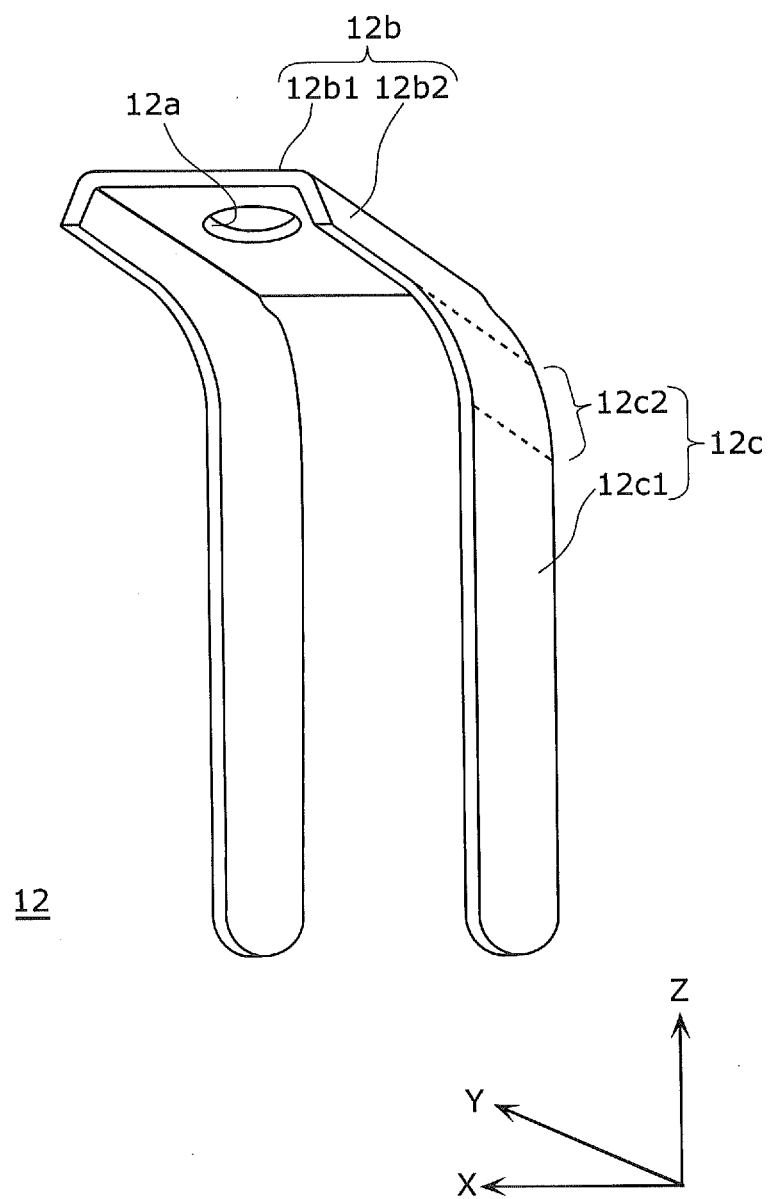
FIG. 4 is a perspective view of one of the current collectors of the non-aqueous electrolyte secondary battery.

Next, with reference to FIG. 4 and FIG. 5, the structure of the current collector 12 is described in detail. FIG. 4 is a perspective view looking up the current collector 12. FIG. 5A is a view in the Y-axis direction, and FIG. 5B is a view in the X-axis direction.

As shown in the diagrams, the current collector 12 is formed by, for example, press-bending a single metal plate, and includes a base part 12b including a part having a flat plate shape, and paired arm parts 12c which extend downward from both the ends in the X-axis direction of the base part 12b.

Figure 5A:
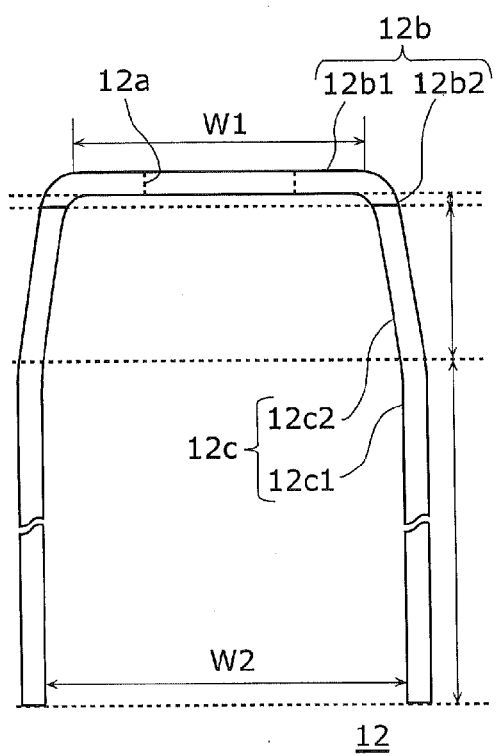
FIG. 5A is a view of the current collectors in the Y-axis direction.
Figure 5A:
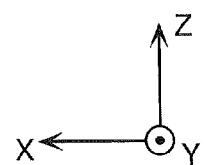

As shown in FIG. 4 and FIG. 5A, the base part 12b includes a flat-plate shaped plate part 12b1 having a through-hole 12a formed therein, and paired wall parts 12b2 formed by bending at paired sides in the Y-axis direction of the plate part 12b1. The paired wall parts 12b2 are tilted so as to be farther apart from each other at the positions closer to the bottom part, in accordance with the side wall 21c which is the inner surface of the side wall 21d of the recess part 21x in the cap part 20 shown in FIG. 3. Each of the paired wall parts 12b2 is continuous to the corresponding one of the paired arm parts 12c at its end part in the Y-axis direction of the container 30 (the right side in FIG. 5B). In other words, the respective wall parts 12b2 are continuous to the arm part 12c at only portions thereof closer to the projection part 11a of the electrode assembly 11.

Figure 5B:
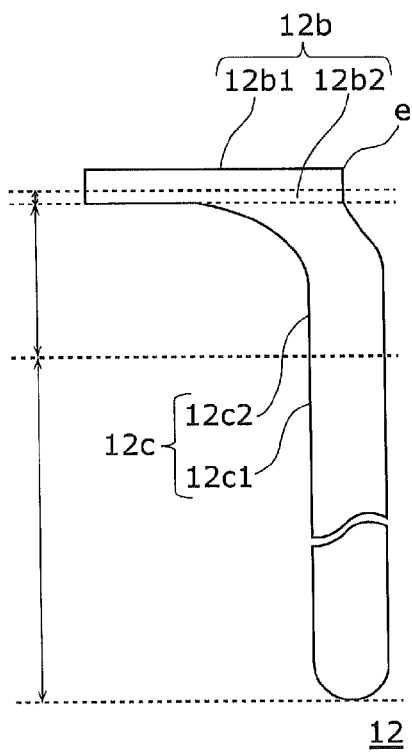
FIG. 5B is a view of one of the current collectors in the X-axis direction.
Figure 5B:
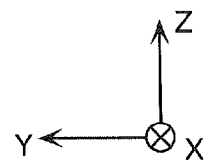

Next, each of the paired arm parts 12c includes an arm body 12c1 connected to the electrode assembly 11 and a bridge part 12c2 which bridges the arm body 12c1 and the wall part 12b2. Each of the paired arm body 12c1 is a flat plate looking long in appearance which extends downward from the plate part 12b1 in the direction orthogonal to the plate part 12b1 along the outside of the side surface facing the X-axis direction of the projection part 11a at the positive electrode side of the electrode assembly 11. In other words, the paired arm bodies 12c1 are parallel to each other. As shown in FIG. 3, the paired arm bodies 12c1 sandwitch the electrode assembly 11 therebetween. Here, as shown in FIG. 5B, the end portions of the paired arm bodies 12c1 are round when seen from a viewpoint in the X-axis direction. By configuring the arm bodies 12c1 to have round end portions, it is prevented that the surface of the electrode assembly 11 is damaged when the electrode assembly 11 is connected to the current collector 12. It is to be noted that the arm bodies 12c1 may be configured to have rectangular end portions instead of round end portions.

On the other hand, as shown in FIG. 5A, each of the paired bridge parts 12c2 has the same angle with respect to the plate part 12b1 of the base part 12b as the angle of the wall part 12b2 with respect to the plate part 12b1 of the base part 12b. In other words, the bridge parts 12c2 are paired structural elements of the current collectors 12 formed along the lines extending from the paired wall parts 12b2. The paired bridge parts 12c2 are tilted so as to be farther apart from each other at the positions closer to the bottom part. Since the paired wall parts 12b2 and the paired bridge parts 12c2 are tilted in this way, each of the plate parts 12b1 directly in contact with the plate parts 13b of the internal insulation sealing members 13 has, in the X-axis direction of the upper surface of the plate part 12b1, a width W1 smaller than a width W2 which is the spacing between the paired arm bodies 12c1. Since the wall parts 12b2 and the bridge parts 12c2 are formed along the extension lines, and the arm parts 12c and the base parts 12b of the current collector 12 are integrally formed, it is easy to form the arm parts 12c and base parts 12b having sufficient strength and form the paired arm parts 12c precisely.

In addition, as shown in FIG. 2, FIG. 4, and FIG. 5B, the bridge part 12c2 extends from the wall part 12b2 of the base part 12b in the direction toward the Y-axis direction end part of the container 30 such that the arm body 12c1 is positioned at the Y-axis direction end part side of the container 30. In this way, the outer side of the arm body 12c1 extends to a point outer than an outer end e of the plate part 12b1.

The non-aqueous electrolyte secondary battery 1 according to this embodiment includes: the container 30 including the cap part 20 having the upper surface 20b with the protrusion part 21 which protrudes outward from the upper surface; and the external insulation sealing member 22 having the side wall part 22a at the side of the side surface of the protrusion part 21. The protrusion part 21 and the side wall part 22a prevent the external insulation sealing member 22 from rotating about the electrode terminal 23 penetrating through the cap part 20 of the container 30. The side wall part 22a extends along the side surface of the protrusion part 21, and the end surface 22f of the end part of the side wall part 22a at the side of the upper surface 20b of the cap part 20 of the container 30 is apart from the upper surface 20b of the cap part 20 of the container 30 by predetermined spacing C.

Accordingly, for example, even when the external insulation sealing members 22 and the container 30 are pressure-bonded by the electrode terminal 23, it is possible to prevent the end surface 22f of the end part of the side wall part 22a from pressing the upper surface 20b of the cap part 20 of the container 30. For this reason, it is possible to prevent that the protrusion part area having the through-hole 21a in the cap part 20 of the container 30 is not completely sealed by the external insulation sealing member 22 with an unsealed area left, and that the side wall 22a itself is corrupted. In this way, it is possible to achieve a sufficient degree of air-tightness of the container 30.

In addition, the container 30 of the non-aqueous electrolyte secondary battery 1 according to this embodiment is provided with the through-hole 21a through which the electrode terminal 23 penetrates the protrusion part 21 of the cap part 20 in the container 30. The external insulation sealing member 22 and the protrusion part 21 of the container 30 are pressure-bonded by the electrode terminal 23 so as to seal, by the external insulation sealing member 22, the gap between the protrusion part area having the through-hole 21a in the cap part 20 of the container 30 and the connection part 23b which penetrates through the through-hole 21a of the protrusion part 21.

Accordingly, it is possible to prevent that the end part of the side wall part 22a presses the upper surface 20b of the cap part 20 in the container 30 when the external insulation sealing member 22 and the cap part 20 of the container 30 is pressure-bonded by the electrode terminal 23. In this way, the pressure that occurs between the electrode terminal 23 and the riveted end 23c is communicated only to the plate part 22b in contact with the plate part 21b of the protrusion part 21 without being communicated to the side wall part 22a in the external insulation sealing member 22. Therefore, the external insulation sealing member 22 and the protrusion part 21 can closely be in surface contact with each other. For this reason, it is possible to prevent that the protrusion part area having the through-hole 21a in the cap part 20 of the container 30 is not completely sealed by the external insulation sealing member 22 with an unsealed area left, and that the side wall 22a itself is corrupted. In this way, it is possible to achieve a sufficient degree of air-tightness of the container 30.

In addition, the non-aqueous electrolyte secondary battery 1 according to this embodiment includes a column-shaped connection part 23b which penetrates through the cap part 20 of the container 30 and is electrically connected to the current collector 12. The external insulation sealing member 22 includes a plate part 22b which is disposed between the protrusion part 21 of the container 30 and the terminal body 23a, and a cylinder part 22c for insulating the protrusion part area having the through-hole 21a in the cap part 20 of the container 30 and the connection part 23b. The end part which is of the connection part 23b and at the side opposite to the side of the terminal body 23a is riveted in the state where the connection part 23b penetrates through the cylinder part 22c of the external insulation sealing member 22 and the through-hole 21a of the cap part 20, and thereby the protrusion part 21 of the cap part 20 of the container 30 and the external insulation sealing member 22 are pressure-bonded to each other.

Accordingly, with the external insulation sealing member 22 under the state of being pressure-bonded, it is possible to bring the plate part 22b having the through-hole 22d of the external insulation sealing member 22 into close contact with the plate part 21b having the through-hole 21a in the protrusion part 21, and thus to reliably seal the container 30. In addition, the external insulation sealing member 22 can reliably insulate the protrusion part 21 and the terminal body 23a of the electrode terminal 23. Furthermore, since the connection part 23b of the electrode terminal 23 penetrates the external insulation sealing member 22 via the cylinder part 22c, the external insulation sealing member 22 reliably insulates the protrusion part area having the through-hole 21a in the cap part 20 of the container 30 and the connection part 23b of the electrode terminal 23.

In addition, as shown in FIG. 3, in the non-aqueous electrolyte secondary battery 1 according to this embodiment, the paired side parts 22a2 and 22a4 arranged in the Y-axis direction among the side parts of the side wall part 22a of the external insulation sealing member 22 are tilted so as to be farther apart from each other at the positions closer to the upper surface 20b of the cap part 20, suitably for the tilt of the outer surfaces of the side parts 21d2 and 21d4. The outer surfaces are positioned outside the container 30 in the Y-axis direction, and the side parts 21d2 and 21d4 are of the paired side wall parts 21d of the protrusion part 21 of the cap part 20.

Since the side wall part 22a needs to function as a rotation prevention means, supposing that both of the side wall part 21d and the side wall part 22a are upright wall parts (that is, wall parts parallel to the Z-axis direction), at least one of the protrusion part 21 and the outer edge in a plan view of the external insulation sealing member 22 must be precisely formed when the external insulation sealing member 22 is disposed on the protrusion part 21. In addition, it is not easy to assemble the both even when it is possible to precisely form the protrusion part 21 and the external insulation sealing member 22. This is because it is undesirable to provide clearance between the both, considering the rotation prevention function of the external insulation sealing member 22.

In order to solve this, it is possible to easily assemble the protrusion part 21 and the external insulation sealing member 22 and provide the side wall part 22a of the external insulation sealing member 22 with the rotation prevention function, by forming the side parts of the side wall part 21d and the side parts of the side wall part 22a with a tilt with respect to each other. In addition, it is possible to secure the adhesion between the upper surface of the plate part 21b of the protrusion part 21 and the lower part of the plate part 22b of the external insulation sealing member 22.

In addition, in the non-aqueous electrolyte secondary battery 1 according to this embodiment, the first angle θ1 formed by the part 22a2 of the side wall part 22a and the part 22a4 of the side wall part 22a is equal to the second angle θ2 formed by the first side surface 21c2 and the second side surface 21c4. For this reason, the inner surface in the X-axis direction of the part 22a2 of the side wall part 22a and the first side wall 21c2 are closely in contact with each other, and the inner surface in the X-axis direction of the part 22a4 of the side wall part 22a and the second side wall 21c4 are closely in surface contact with each other. In this way, it is possible to reliably achieve a higher degree of adhesion in pressure-bonding while maintaining the easiness in boding the protrusion parts 21 and the external insulation sealing members 22.

In addition, the present invention is not limited to the above-described exemplary case in which, in the side wall part 21d of the protrusion part 21, the paired parts 21d1 and 21d3 continuous to the outer edge in the X-axis direction of the plate part 21b of the protrusion part 21 are formed by bending perpendicularly to the cap body 20a and the plate part 21b, and the paired parts 21d2 and 21d4 continuous to the outer edge in the Y-axis direction of the plate part 21b of the protrusion part 21 are formed by being bent with a tilt so as to be farther apart from each other at the positions closer to the cap body 20a. Alternatively, the paired parts continuous to the outer edge in the X-axis direction of the plate part 21b may be formed by being bent with a tilt so as to be farther apart from each other at the positions closer to the cap body 20a, and the paired parts continuous to the outer edge in the Y-axis direction of the plate part 21b may be formed by bending perpendicularly to the plate part 21b.

In addition, the present invention is not limited to the above-described exemplary case in which, the side wall part 22a of the external insulation sealing member 22 is formed to have a shape matching the shape of the side wall part 21d of the protrusion part 21, and thus the paired parts 22a1 and 22a3 in the X-axis direction of the side wall part 22a are perpendicular to the plate part 22b2 and that the paired parts 22a2 and 22a4 in the Y-axis direction are tilted with respect to each other. Alternatively, the paired parts in the X-axis direction of the side wall part 22a and the paired parts in the Y-axis direction of the side wall part 22a may be exchanged. Accordingly, the side wall part 22a of the insulation sealing member 22 may be perpendicular in the Y-axis direction and may be tilted in the X-axis direction.

The side wall part 21d of the protrusion part 21 and the side wall part 22a of the external insulation sealing member 22 may be tilted in both the Y-axis direction and the X-axis direction. Furthermore, each of the side wall part 21d and the side wall part 22a may be configured to have at least one tilted surface among the four side parts thereof. In any case, it is possible to obtain the same or similar advantageous effect as in the example shown in FIG. 3.

As described above, the non-aqueous electrolyte secondary battery 1 according to the exemplary embodiment of the present invention is configured to include a combination of (i) a protrusion part 21 formed in a cap part 20 and (ii) an external insulation sealing member 22 which has a side wall part 22a with an end surface 22f apart from the upper surface 20b of the cap part 20 and has a rotation prevention function, and thus the non-aqueous electrolyte secondary battery 1 having the external insulation sealing member 22 with the rotation prevention function can provide a high air-tightness around the electrode terminal 23.

However, the present invention is not limited to the above embodiment.

It is assumed here that, in the non-aqueous electrolyte secondary battery 1 according to Embodiment 1, the end surface 22f of the side wall part 22a and the upper surface 20b are apart from each other by the predetermined spacing C in the state where the current collector 12 and the electrode terminal 23 are pressure-bonded to each other. Here, it is assumed that the both are apart from each other by certain spacing even when the current collector 12, the electrode terminal 23, the external insulation sealing member 22, and the internal insulation sealing member 13 are arranged in a simple combination before the lower end of the connection part 23b of the electrode terminal 23 is riveted.

In order to secure a sufficient degree of air-tightness between the external insulation sealing member 22 and the protrusion part 21 of the cap part 20, a pressure is placed onto the end surface 22f of the side wall part 22a and the upper surface 20b of the cap part 20, and thereby the upper surface of the plate part 21b of the protrusion part 21 and the lower surface of the plate part 22b of the external insulation sealing member 22 are closely contact-bonded to each other to have wider contact areas. The present invention mainly aims to remove a hindrance in achieving such wider adhesion areas in the case of the external insulation sealing member 22 configured to have the side wall part 22a with the rotation prevention means, that is, to prevent the side wall part 22a of the external insulation sealing member 22 from abutting, at the rotation prevention means thereof, the upper surface 20b of the cap part 20.

Accordingly, the present invention includes the configuration in which the end surface 22f of the side wall part 22a and the upper surface 20b are apart from each other before the current collector 12 and the electrode terminal 23 are pressure-bonded to each other, and the configuration in which the end surface 22f and the upper surface 20b are very close to each other with the predetermined spacing C that is substantially zero in the state where the current collector 12 and the electrode terminal 23 are pressure-bonded to each other, as long as there is no pressure between the end surface 22f of the side wall part 22a and the upper surface 20b of the cap part 20 even if they are in contact with each other.

For this reason, the present invention includes the non-aqueous electrolyte secondary battery manufactured according to the following manufacturing method. The manufacturing method of manufacturing an energy storage element which includes: a container; an electrode assembly housed in the container; electrode terminals; current collectors each of which electrically connects a corresponding one of the electrode terminals and the electrode assembly; and insulation members each of which insulates the container and a corresponding one of the electrode terminals, the method including: disposing each of the insulation members to be sandwiched between the container and a corresponding one of the electrode terminals; and pressure-bonding, by each of the corresponding electrode terminals, a corresponding one of the insulation members and a corresponding one of the protrusion parts of the cap part, within a range in which an upper surface of the cap part is not pressed by an end part of the side part.

Figure 6:
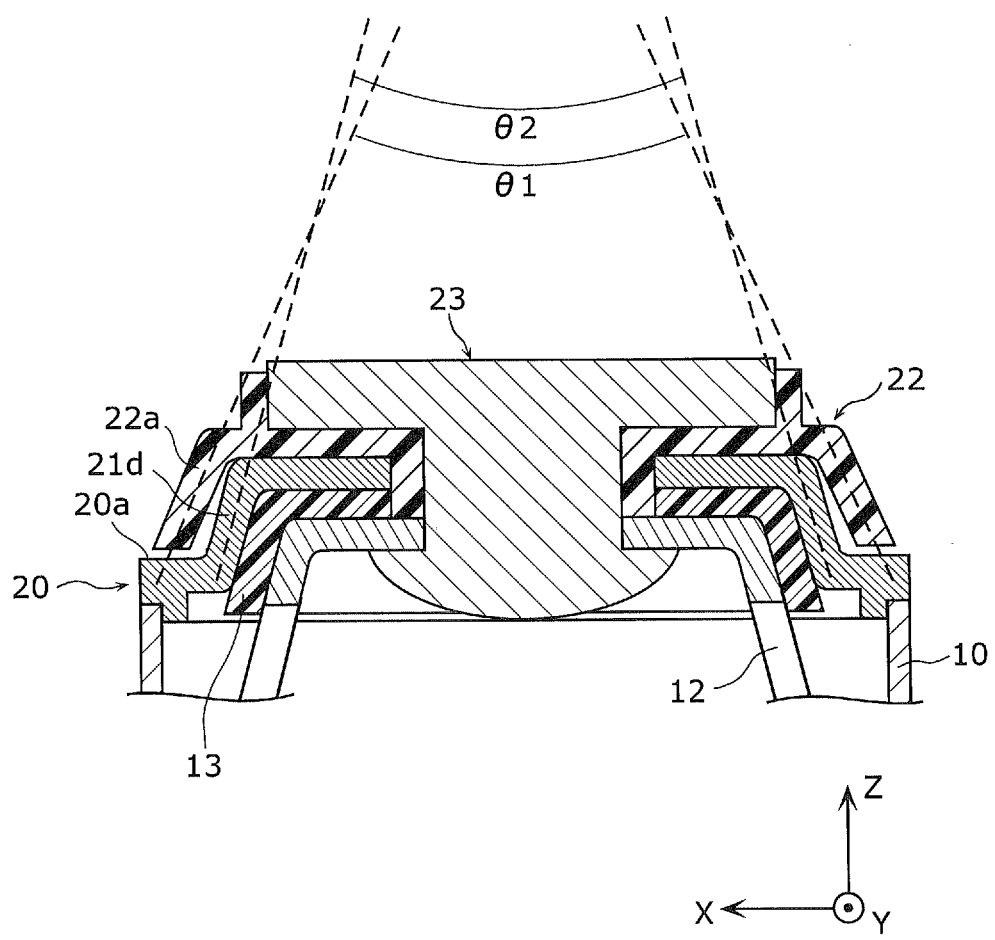
FIG. 6 is a cross-sectional view of main parts around the insulation sealing members of the non-aqueous electrolyte secondary battery.

In addition, in the non-aqueous electrolyte secondary battery 1 according to the above embodiment, the first angle θ1 formed by the part 22a2 and the part 22a4 of the side wall part 22a is equal to the second angle θ2 formed by the first side surface 21c2 and the second side surface 21c4. For example, as shown in the cross-sectional view of main parts in FIG. 6, the first angle θ1 formed by the part 22a2 and the part 22a4 of the side wall part 22a may be larger than the second angle θ2 formed by the first side surface 21c2 and the second side surface 21c4.

In addition, in the non-aqueous electrolyte secondary battery 1 according to the above embodiment, the protrusion part 21 of the cap part 20 is formed to have a reversed shape corresponding to the recess part 21x formed behind the protrusion part 21. However, the protrusion part 21 in the present invention may be formed irrespective of the presence or absence of the recess part 21x.

It is preferable to form such a recess part 21x when forming the protrusion part 21 because the following advantageous effects can be obtained. More specifically, the recess part 21x can be the recess part in the present invention used to house the internal insulation sealing member 13 and the base part 12b of the current collector 12, and thus the configuration can be achieved in which only the arm part 12c of the current collector 12 is present as a component other than the electrode assembly 11 inside the container body 10. For this reason, it is possible to increase the housing efficiency of the electrode assembly 11 in the container 30.

In addition, in the non-aqueous electrolyte secondary battery 1 according to the above embodiment, the side wall part 22a of the external insulation sealing member 22 is configured to enclose the four side parts of the side surface 21c of the protrusion part 21. However, the side wall part 22a may be configured to cover one of the four side parts. In addition, the side wall part 22a may be, for example, a plurality of column-shaped parts instead of a wall body as long as the side wall part 22a is a side part which is disposed at the sides of the side wall 21c of the protrusion part 21 and prevents the external insulation sealing member 22 from rotating about the connection part 23b of the electrode terminal 23.

In addition, in the non-aqueous electrolyte secondary battery 1 according to the above embodiment, a frame body 22e is formed on the upper surface of the plate part 22b of the external insulation sealing member 22, and the electrode terminal 23 is mounted inside the plate part 22b enclosed by the frame body 22e. However, the non-aqueous electrolyte secondary battery 1 may be configured not to include the frame body 22e. It is preferable to provide the frame body 22e because the following advantageous effects can be obtained. By housing the terminal body 23a of the electrode terminal 23 inside the open space enclosed by the frame body 22e and the plate part 22b, it is possible to prevent the electrode terminal 23 from rotating about the connection part 23b and secure the air-tightness around electrode terminal 23. The frame body 22e is formed along the entire periphery of the plate part 22b, but may be formed along part of the periphery.

Figure 7:
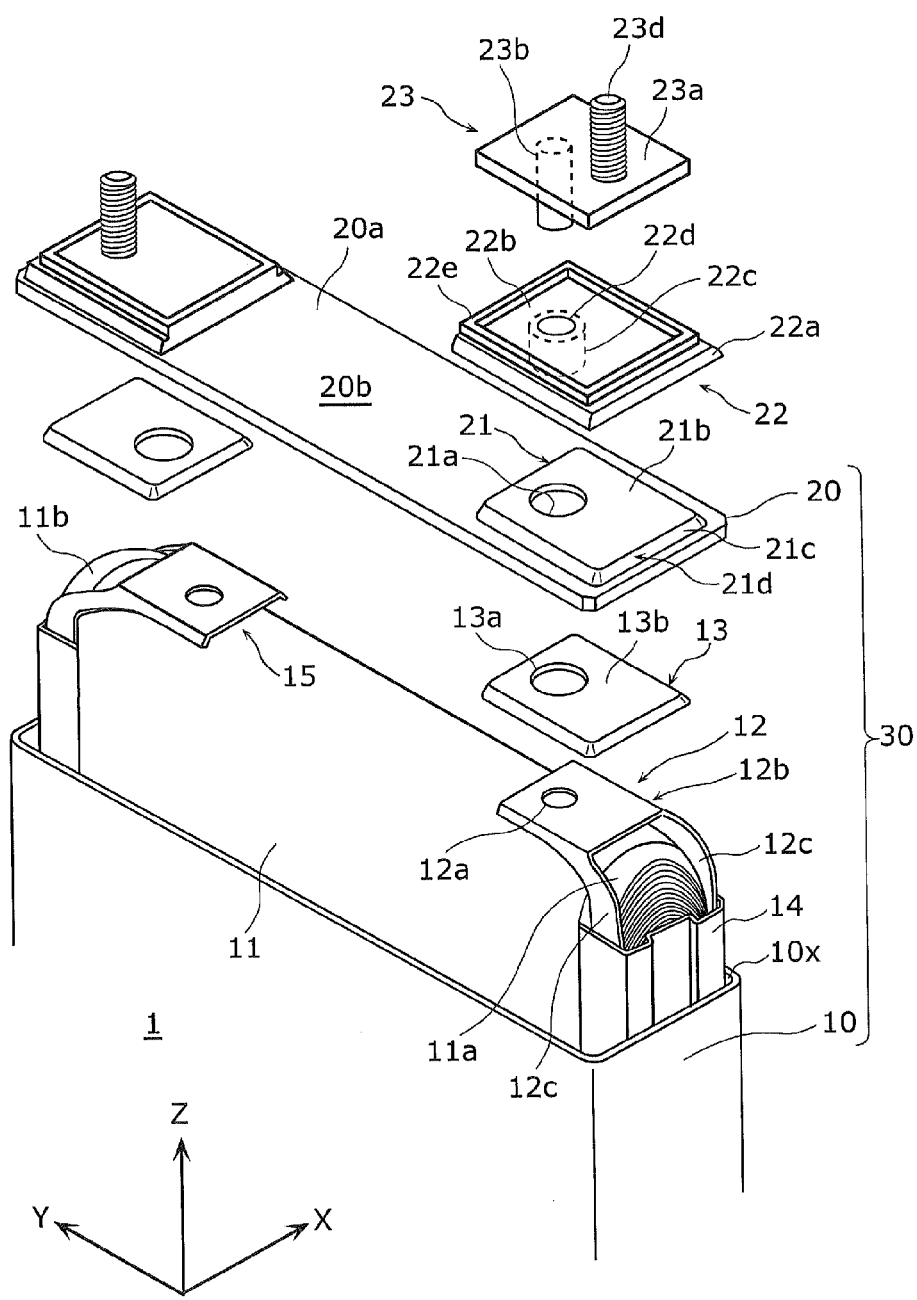
FIG. 7 is a schematic exploded perspective view of a non-aqueous electrolyte secondary battery having another structure according to the embodiment.

In addition, in the non-aqueous electrolyte secondary battery 1 according to the above embodiment, the electrode terminal 23 includes the terminal body 23a having the shape of a flat plate, and the terminal of the external load is fixed by welding onto the surface of the terminal body 23a. However, as shown in FIG. 7, the non-aqueous electrolyte secondary battery 1 may be configured to include a bolt part 23d provided on the upper surface of the terminal body 23a. The bolt part 23d makes it possible to connect the terminal of the external load and the non-aqueous electrolyte secondary battery 1 in a freely attachable and detachable manner. The bolt part 23d is an example of a protrusion in the present invention, and may be used as a mere unthreaded bar-shaped member.

In addition, in the non-aqueous electrolyte secondary battery 1 according to the above embodiment, the plate part 22b of the external insulation sealing member 22 is rectangular-shaped. However, the plate part 22b of the external insulation sealing member 22 may have an arbitrary but non-circular shape, so as not to rotate on the protrusion part 21. Likewise, the plate part 21b of the protrusion part 21 may have an arbitrary but non-circular shape corresponding to the shape of the plate part 22b of the external insulation sealing member 22.

In addition, in the non-aqueous electrolyte secondary battery 1 according to the above embodiment, the connection part 23b of the electrode terminal 23 is configured to include a rivet having a riveted end at the side opposite to the side of the terminal body 23a, and thereby the external insulation sealing member 22, the cap part 20, the internal insulation sealing member 13, and the current collector 12 are pressure-bonded to each other. However, the connection part 23b of the electrode terminal 23 may not be a rivet. For example, the tip of the connection part 23b may be configured as a bolt, and a nut may be used in combination with the bolt as a replacement of the riveted end 23c of the connection part 23b to pressure-bond the external insulation sealing member 22, the cap part 20, the internal insulation sealing member 13, and the current collector 12. It is to be noted that the external insulation sealing member 22 and the cap part 20 need to be pressure-bonded as the minimum components for enabling sealing of the through-hole 21a to be formed in the cap part 20.

In addition, the electrode assembly in the present invention is a winding-type electrode assembly in the above description, but may be a stacking-type electrode assembly.

In addition, the energy storage element is the non-aqueous electrolyte secondary battery 1 represented by the lithium ion secondary battery in the above description, but may be any other secondary battery such as a nickel hydrogen battery which can charge and release electric energy as electrochemical reactions. Alternatively, the energy storage element may be a primary battery. Furthermore, the energy storage element may be an element for directly storing electricity as charge, such as an electric double-layer capacitor. In short, the energy storage element in the present invention may be any element for storing electricity, and thus the present invention is not limited to the energy storage elements of specific types.

In addition, in the above description, the battery container including the container body 10 and the cap part 20 corresponds to an element container in the present invention, and the electric terminals are provided on the cap part 20. However, the present invention may be implemented as an energy storage element having electric terminals at the side of a container body. In short, the present invention can be implemented as an electricity storage element arbitrarily configured, as long as the electricity storage element includes a base part of the current collector disposed inside a recess part formed at an arbitrary position inside the element container. Accordingly, the present invention is not limited to the states of the connection between the cap part and container body of the element container, and the kinds, shapes, number of the members of the element container.

In addition, the battery body is made of aluminum, but may contain an aluminum alloy, any other metal such as stainless, or a metal compound. In addition, the battery has a hexahedral shape in appearance, but may have a cylindrical shape instead. In short, the element container according to the present invention is not limited to element containers having specific configurations in terms of shapes, materials, and so on.

To sum up, the present invention may be implemented by adding various kinds of modifications to the above embodiment, in addition to the aforementioned variations, within the scope of the present invention.

INDUSTRIAL APPLICABILITY

The present invention as described above provides an advantageous effect of being able to increase the air-tightness around electrode terminals, and is applicable to, for example, energy storage elements such as secondary batteries.

The invention claimed is:

1. An energy storage element, comprising:
   a container;
   an electrode assembly housed in the container;
   an electrode terminal;
   a current collector which electrically connects the electrode terminal and the electrode assembly; and
   an insulation member which insulates the container and the electrode terminal,
   wherein the container includes a protrusion part which protrudes outward from an upper surface of the container,
   wherein the protrusion part includes a top part including a through-hole for allowing penetration of the electrode terminal,
   wherein the electrode terminal is electrically connected to the current collector in a state where the electrode terminal penetrates through the protrusion part via the through-hole,
   wherein the insulation member includes a side part positioned along a side surface of the protrusion part,
   wherein the side part of the insulation member includes an end part which faces the upper surface of the container and is spaced apart from the upper surface, and
   wherein the end part of the side part and the upper surface of the container are apart from each other before the current collector and the electrode terminal are pressure-bonded to each other such that there is no pressure between the end part of the side part and an upper surface of a cap part of the container.

2. The energy storage element according to claim 1, wherein the electrode terminal is configured to pressure-bond at least the insulation member and the protrusion part of the container, so that the electrode terminal is sealed from a protrusion part area including the through-hole of the container by the insulation member, and
wherein the side part of the insulation member has the end part spaced apart from the upper surface of the container in a state where the insulation member is pressure-bonded to the protrusion part of the container by the electrode terminal.

3. The energy storage element according to claim 1, wherein the electrode terminal includes:
a plate-shaped terminal body disposed above the protrusion part in a protrusion direction of the protrusion part; and
a column-shaped connection part which extends in a direction crossing a principal surface of the terminal body and penetrates through the protrusion part via the through-hole.

4. The energy storage element according to claim 3, wherein the insulation member further includes:
a cylinder part which is sandwiched between the through-hole of the protrusion part and the connection part; and
a plate part which is sandwiched between the protrusion part and the electrode terminal, and which extends, from an end part of the cylinder part, in an outward direction crossing an axis of the cylinder part, and
wherein the side part of the insulation member is formed continuously from an outer edge of the plate part, along the side surface of the protrusion part.

5. The energy storage element according to claim 3, wherein the electrode terminal includes a riveted end having an outer diameter larger than a diameter of the through-hole of the protrusion part, the riveted end being formed by riveting an end portion of the connection part, and the end portion being at a side opposite to the terminal body, and
wherein the electrode terminal is configured to sandwich and pressure-bond, by the riveted end and the terminal body, the protrusion part of the container and the insulation member.

6. The energy storage element according to claim 5, wherein the top part is for sandwiching the plate part together with the terminal body,
wherein the side surface of the protrusion part includes a side wall part which is formed continuously from an outer edge of the top part, in contact with the upper surface of the container, and
wherein the plate part of the top part has a non-circular outer edge.

7. The energy storage element according to claim 1, wherein the side part of the insulation member includes:
a first side wall part positioned along a first part of the side surface of the protrusion part; and
a second side wall part positioned along a second part of the side surface of the protrusion part, the second part being opposite to the first part, and
wherein the first side wall part and the second side wall part are tilted so as to be farther apart from each other at positions closer to the upper surface of the container.

8. The energy storage element according to claim 7, wherein the protrusion part includes a first side surface facing the first side wall part and a second side surface facing the second side wall part, and the first side surface and the second side face are tilted so as to be farther apart from each other at the positions closer to the upper surface of the container, and
wherein the first side wall part and the second side wall part form a first angle which is larger than or equal to a second angle formed by the first side surface and the second side surface.

9. The energy storage element according to claim 1, wherein the protrusion part is formed in the cap part of the container.

10. The energy storage element according to claim 1, wherein, in a protrusion direction of the protrusion part outward from the upper surface of the container, a gap extends from the upper surface of the container toward the end part of the insulation member.

11. The energy storage element according to claim 10, wherein the upper surface of the container and the end part of the insulation member are exposed on opposing sides of the gap such that a portion of the upper surface of the container, which in the protrusion direction is located below the end part of the insulation member, is uncovered by the end part of the insulation member.

12. The energy storage element according to claim 11, wherein a portion of the side surface of the protrusion part, located above the upper surface of the container, is exposed in the gap and is uncovered by the insulation member.

13. The energy storage element according to claim 1, wherein a portion of the side surface of the protrusion part, located above the upper surface of the container, is exposed and is uncovered by the insulation member, the end part of the insulation member comprising a bottom surface of the insulation member.

14. The energy storage element according to claim 1, wherein a portion of the side surface of the protrusion part is tilted with respect to a protrusion direction of the protrusion part outward from the upper surface of the container.

15. The energy storage element according to claim 14, wherein the insulation member is disposed between the electrode terminal and the protrusion part, the insulation member including a portion that extends parallel to the portion of the side surface of the protrusion part.

16. A method of manufacturing an energy storage element which includes:
a container;
an electrode assembly housed in the container;
an electrode terminal;
a current collector which electrically connects the electrode terminal and the electrode assembly; and
an insulation member which insulates the container and the electrode terminal,
the method comprising:
disposing the insulation member to be sandwiched between the container and the electrode terminal; and
pressure-bonding, by the electrode terminal, a side part of the insulation member and a side surface of a protrusion part of the container, within a range in which an upper surface of the container is not pressed by an end part of the side part, the upper surface of the container facing the end part of the side part,
wherein the end part of the side part and the upper surface of the container are apart from each other before the current collector and the electrode terminal are pressure-bonded to each other such that there is no pressure between the end part of the side part and an upper surface of a cap part of the container.

17. The method according to claim 16,
wherein the protrusion part is formed in the cap part of the container, and
wherein the pressure-bonding being pressure-bonding, by the electrode terminal, the insulation member, and the protrusion part in the cap part of the container, within a range in which an upper surface of the cap part of the container is not pressed by the end part of the side part.

18. The method according to claim 16, wherein, in a protrusion direction of the protrusion part outward from the upper surface of the container, a gap extends from the upper surface of the container toward the end part of the insulation member,
wherein the upper surface of the container and the end part of the insulation member are exposed on opposing sides of the gap such that a portion of the upper surface of the container, which in the protrusion direction is located below the end part of the insulation member, is uncovered by the end part of the insulation member, and
wherein a portion of the side surface of the protrusion part, located above the upper surface of the container, is exposed in the gap and is uncovered by the insulation member.

19. The method according to claim 16, wherein a portion of the side surface of the protrusion part, located above the upper surface of the container, is exposed and is uncovered by the insulation member, the end part of the insulation member comprising a bottom surface of the insulation member.

20. The method according to claim 16, wherein a portion of the side surface of the protrusion part is tilted with respect to a protrusion direction of the protrusion part outward from the upper surface of the container, and
wherein the insulation member is disposed between the electrode terminal and the protrusion part, the insulation member including a portion that extends parallel to the portion of the side surface of the protrusion part.

* * * * *